United States Patent
Loh et al.

(10) Patent No.: US 12,455,823 B2
(45) Date of Patent: Oct. 28, 2025

(54) SUPER-TEMPORAL CACHE REPLACEMENT POLICY

(71) Applicant: Advanced Micro Devices, Inc., Santa Clara, CA (US)

(72) Inventors: Gabriel Hsiuwei Loh, Bellevue, WA (US); Joseph Lee Greathouse, Austin, TX (US); William Louie Walker, Fort Collins, CO (US); Paul James Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/332,112

(22) Filed: Jun. 9, 2023

(65) Prior Publication Data
US 2024/0411692 A1 Dec. 12, 2024

(51) Int. Cl.
*G06F 12/0802* (2016.01)
(52) U.S. Cl.
CPC ...... *G06F 12/0802* (2013.01); *G06F 2212/60* (2013.01)
(58) Field of Classification Search
CPC .................. G06F 12/0802; G06F 2212/60
See application file for complete search history.

(56) References Cited

U.S. PATENT DOCUMENTS

| | | | |
|---|---|---|---|
| 2002/0116584 A1 | 8/2002 | Wilkerson | |
| 2010/0064109 A1* | 3/2010 | Bull | G06F 9/3851 |
| | | | 711/E12.013 |
| 2010/0191916 A1* | 7/2010 | Balakrishnan | G06F 12/0811 |
| | | | 711/134 |
| 2012/0254548 A1* | 10/2012 | Comparan | G06F 12/0815 |
| | | | 711/135 |

(Continued)

FOREIGN PATENT DOCUMENTS

WO 2024253798 A1 12/2024

OTHER PUBLICATIONS

CUDA, "CUDA C++ Programming Guide v12.0", NVIDIA Corporation & Affiliates [retrieved Jan. 30, 2023]. Retrieved from the Internet <https://docs.nvidia.com/cuda/cuda-c-programming-guide/index.html#L2_access_intro>. Reference 1 of 2, 546 Pages.

(Continued)

*Primary Examiner* — Edward J Dudek, Jr.
(74) *Attorney, Agent, or Firm* — FIG. 1 Patents

(57) ABSTRACT

Cache replacement policies are described. In accordance with the described techniques, a request for data is received and a cache replacement policy controls how a controller responds to the request. The cache replacement policy assigns each cacheline a priority value, which indicates whether the cacheline should be preserved relative to other cachelines, in response to the request being a cache miss that necessitates eviction of at least one cacheline. The cache replacement policy decrements priority values until at least (Continued)

one cacheline achieves a minimum priority value, at which point a cacheline is evicted. The cache replacement policy designates certain cachelines as protected, either via a separate protected indicator or via the cacheline's priority value, which causes unprotected cachelines to be selected for eviction while favoring preservation of protected cachelines in the cache.

20 Claims, 5 Drawing Sheets

(56) References Cited

U.S. PATENT DOCUMENTS

| | | | | |
|---|---|---|---|---|
| 2013/0191600 | A1* | 7/2013 | Kuesel | G06F 12/0888 |
| | | | | 711/E12.07 |
| 2013/0247060 | A1* | 9/2013 | Makljenovic | G06F 9/526 |
| | | | | 718/104 |
| 2014/0006717 | A1* | 1/2014 | Steely, Jr. | G06F 12/0862 |
| | | | | 711/E12.022 |
| 2015/0032968 | A1* | 1/2015 | Heidelberger | G06F 12/0888 |
| | | | | 711/138 |
| 2015/0186280 | A1 | 7/2015 | Lepak et al. | |
| 2017/0052905 | A1* | 2/2017 | Lin | G06F 12/126 |
| 2021/0182216 | A1 | 6/2021 | Yin et al. | |
| 2023/0236968 | A1* | 7/2023 | Gieske | G06F 12/0802 |
| | | | | 711/118 |
| 2024/0289282 | A1* | 8/2024 | Redshaw | G06F 12/0891 |

OTHER PUBLICATIONS

CUDA , "CUDA C++ Programming Guide v12.0", NVIDIA Corporation & Affiliates [retrieved Jan. 30, 2023]. Retrieved from the Internet <https://docs.nvidia.com/cuda/cuda-c-programming-guide/index.html#/L2_access_intro>. Reference 2 of 2, 546 pages.

PCT/US2024/028570 , "International Search Report and Written Opinion", International Application No. PCT/US2024/028570, Aug. 20, 2024, 11 pages.

\* cited by examiner

SUPER-TEMPORAL CACHE REPLACEMENT POLICY

BACKGROUND

A cache is a hardware or software component that stores data (at least temporarily) so that a future request for the data is served faster than it would be if the data were served from main memory. A "cache hit" occurs when requested data can be found in the cache, while a "cache miss" occurs when requested data cannot be found in the cache. A cache miss occurs, for example, in scenarios where the requested data has not yet been loaded into the cache or when the requested data was evicted from the cache prior to the request. A cache replacement policy defines rules for selecting one of the cachelines of the cache to evict so that the requested data can be loaded into the selected cacheline responsive to a cache miss.

BRIEF DESCRIPTION OF THE DRAWINGS

The detailed description is described with reference to the accompanying figures.

DETAILED DESCRIPTION

Figure 1:
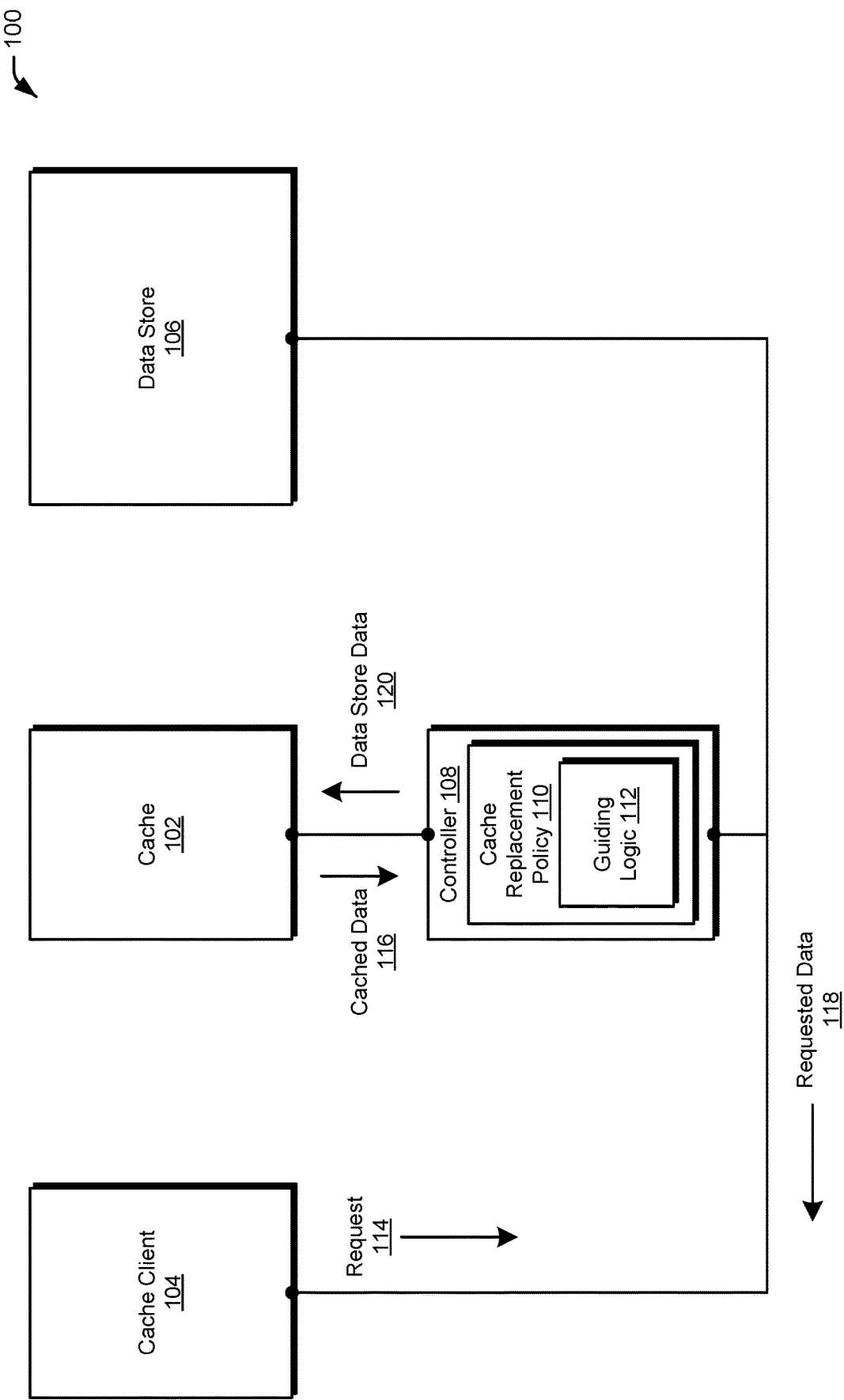
FIG. 1 is a block diagram of a non-limiting example system having a cache and a controller with a guided cache replacement policy in accordance with one or more implementations.

A cache is a hardware or software component that stores data, such that a future request for the data is served faster than it would be if the data were served from main memory. Because caches can only store a limited amount of data, it is beneficial to maintain data in cache that is continuously accessed, or will be accessed in the future, to perform a computational task. As such, caches improve computational system performance when they store data that is relevant to a computational task being performed.

In implementations where data needed to perform a computational task is not stored in cache, a processing device performing (e.g., executing) the computational task is required to retrieve the data from system main memory, which induces latency into performance of the computational task, creates a bottleneck on a communication channel (e.g., data bus) connecting the processing device to the main memory, takes additional time to retrieve, and overall degrades performance of a processing device executing the computational task.

Cache replacement policies decide what data stored in cache should be replaced (e.g., written to main memory or otherwise evicted from the cache without writing to main memory) in situations where new data is needed for performance of a computational task but not currently stored in an already-full cache.

A cache replacement policy defines rules for selecting one of the cachelines of the cache to evict so that the requested data can be loaded into the selected cacheline (e.g., in response to a cache miss for the requested data). Conventional cache replacement policies include least recently used (LRU) algorithms, re-reference interval prediction (RRIP) algorithms, and so forth. A LRU algorithm operates by favoring retention of data objects in cache that are most recently used (e.g., returned in response to a request for data) as part of performing a computational task. While LRU algorithms are suitable for a range of computational tasks, they are relatively expensive because they require dedicated hardware (e.g., dedicated bits in cache) to keep track of the age of every single cacheline and update this information as data objects are read from or written into cache.

The RRIP algorithm shares similar considerations with the LRU algorithm without explicitly keeping track of cacheline age. Rather, the RRIP algorithm predicts different values indicating when data stored in cache might be needed (e.g., values that generally indicate one of soon, later, even later, and much later). This RRIP algorithm avoids the LRU assumption that different data maintained in cache will be accessed again at the same probability of frequency, which enables favoring eviction of cachelines that are not predicted to be used again soon to perform a computational task. However, a significant limitation of the RRIP algorithm is that the RRIP algorithm is not provided with prior information indicating that data will be reused. Rather, the RRIP algorithm is limited to observing instances where data is reused and subsequently predicting a value indicating when the data might again be needed after observing the data reuse. Thus, conventional cache replacement policy approaches require significant hardware resources to function properly and are unable to account for input or guidance, prior to runtime, that describe specific instances of data to be reused during performance of a computational task.

To address these conventional problems, a cache replacement policy is described that operates on a binary indication as to whether data stored in a cacheline should be protected or unprotected. This binary protected/unprotected indication enables a programmer or developer of a given computational task to simply specify whether the computational task will benefit from preserving certain data objects involved in the computational task in cache or preserving in cache data retrieved from memory storage locations where data is read from/written to during performance of the computational task. In some implementations, the described cache replacement policy involves designating certain bits of a cacheline to identify a priority value for maintaining the cacheline in cache and at least one bit to identify whether the cacheline is protected or unprotected. Cachelines designated as protected are referred to herein as "super-temporal" cachelines, such that they are to be favored for retention in a cache for longer durations of time than unprotected cachelines.

Guiding logic of the cache replacement policy causes the priority value of a cacheline to be increased or otherwise adjusted towards a maximum priority value in scenarios where the cacheline stores data requested for use in performing the computational task. Conversely, the cache replacement policy guiding logic causes the priority value of each cacheline to be decremented or otherwise adjusted towards a minimum priority value in scenarios where requested data is not stored in any of the cachelines (e.g., in response to a cache miss). Via use of the protected indicator, the cache replacement policy guiding logic favors decrementing of unprotected cacheline priority values before decrementing protected cacheline priority values, such that protected cachelines will be maintained in cache over unprotected cachelines in event of a cache miss. In this manner, priority values describe an order in which cachelines are evicted based on cache misses. Advantageously, to avoid cache plaque, the cache replacement policy guiding logic ensures that protected cacheline priority values are also decremented when a cacheline is evicted, thus preventing scenarios where cachelines are constantly kept in cache.

Alternatively, in some implementations the cache replacement policy defines certain cachelines as super-temporal using only an associated priority value and independent of a separate protected/unprotected indicator. For instance, in some implementations guiding logic of the cache replacement policy defines threshold default and maximum values for protected and unprotected cachelines. As a specific example, a cache replacement policy defines a default unprotected value to be assigned as a cacheline's priority value upon insertion of unprotected data into a cache. In this specific example, the cache replacement policy also defines a default protected value to be assigned as a cacheline's priority value upon insertion of protected data into a cache, where the protected default value is different than the unprotected default value.

In implementations where the cache replacement policy involves decrementing priority values until satisfaction of a threshold value that permits data eviction, the default protected value is greater than a default unprotected value. Alternatively, if the cache replacement policy involves incrementing priority values until satisfaction of the eviction threshold value, the default protected value is less than the default unprotected value. The cache replacement policy further defines respective maximum priority values for protected and unprotected cachelines, which constrains a manner in which cacheline priority values are incremented in response to a cache hit.

For instance, in some implementations protected cachelines are permitted to have a priority value that satisfies an unprotected maximum threshold (e.g., is greater than or equal to the unprotected maximum threshold) while unprotected cachelines are not. In implementations where the cache replacement policy involves decrementing priority values until satisfaction of a threshold value that permits data eviction, satisfying the unprotected maximum threshold means having a priority value that is greater than or equal to the unprotected maximum threshold. Alternatively, in implementations where the cache replacement policy involves incrementing priority values until satisfaction of the eviction threshold value, satisfying the unprotected maximum threshold means having a priority value that is less than or equal the unprotected maximum threshold.

In response to a cache miss, a cache replacement policy that involves decrementing cacheline priority values towards the eviction threshold value does so until at least one cacheline satisfies (e.g., is associated with) a minimum priority value threshold. As described herein, the minimum priority value threshold indicates that a cacheline is eligible for eviction. Data included in such a cacheline is evicted (e.g., written back to main memory or otherwise cleared from the cache) to open space for inserting different data as a different cacheline in the cache. Thus, the cache replacement policies described herein selects a cacheline to evict in a manner that favors preservation of data objects identified as important for a given computational task.

Advantageously, the cache replacement policy is enabled via a binary indication of whether an associated data object or memory storage location is important, which avoids the granular manual input required by some conventional approaches as well as the expensive hardware tracking elements required by other conventional approaches. As such, the cache replacement policies described herein represent improvements in time, speed and/or power consumption relative to conventional cache replacement policies.

In some aspects, the techniques described herein relate to a system including a cache, guiding logic to guide decisions of a cache replacement policy by favoring eviction of unprotected cachelines over eviction of protected cachelines, and a controller to select a cacheline of the cache to evict responsive to a cache miss based on the cache replacement policy and the guiding logic.

In some aspects, the techniques described herein relate to a system, wherein the controller is further configured to evict previous data stored in the cacheline, and load data into the cacheline, wherein the data loaded into the cacheline is retrieved for a request that caused the cache miss.

In some aspects, the techniques described herein relate to a system, wherein the guiding logic is generated based on instructions of an application executed by a processor that requests data from the cache.

In some aspects, the techniques described herein relate to a system, wherein the guiding logic includes information specifying at least one data object and the controller is configured to designate a cacheline that stores the at least one data object as being protected based on the guiding logic.

In some aspects, the techniques described herein relate to a system, wherein the guiding logic includes information specifying at least one data storage location and the controller is configured to designate a cacheline that stores data retrieved from the at least one data storage location as being protected based on the guiding logic.

In some aspects, the techniques described herein relate to a system, wherein each cacheline of the cache includes a configurable bit that provides a binary indication as to whether the cacheline is protected or unprotected.

In some aspects, the techniques described herein relate to a system, wherein the controller is further configured to receive a first request for data, identify that the data requested by the first request is stored in a first cacheline of the cache, return the data requested by the first request to a source from which the first request was received, and increment a priority value of the first cacheline.

In some aspects, the techniques described herein relate to a system, wherein the controller is further configured to receive a second request for data, identify that the data requested by the second request is not stored in the cache and that the second request caused the cache miss, and identify a second cacheline as having a priority value that permits eviction, wherein the second cacheline is selected to evict responsive to the cache miss.

In some aspects, the techniques described herein relate to a system, wherein responsive to the cache miss, the guiding logic causes the controller to identify, from the cache replacement policy, a priority value threshold that permits eviction, identify that each cacheline of the cache is associated with a priority value that does not satisfy the priority value threshold, and decrement, a priority value associated with an unprotected cacheline until the priority value associated with the unprotected cacheline satisfies the priority value threshold that permits eviction.

In some aspects, the techniques described herein relate to a system, wherein the controller decrements the priority value associated with the unprotected cacheline independent of modifying a priority value associated with a protected cacheline of the cache.

In some aspects, the techniques described herein relate to a system, wherein the controller decrements the priority value associated with protected cacheline in response to evicting data responsive to the cache miss.

In some aspects, the techniques described herein relate to a system, wherein responsive to decrementing the priority value associated with the unprotected cacheline, at least two unprotected cachelines have associated priority values that satisfy the priority value threshold that permits eviction, wherein the guiding logic further causes the controller to select one of the at least two unprotected cachelines for data eviction based on addresses of the at least two unprotected cachelines.

In some aspects, the techniques described herein relate to a system, wherein the cache replacement policy controls loading data into the cache by causing the controller to assign a default unprotected value to data loaded into the cache responsive to the data being loaded from a data storage location indicated as unprotected by the guiding logic, or assign a default protected to data loaded into the cache responsive to the data being loaded from a data storage location indicated as protected by the guiding logic.

In some aspects, the techniques described herein relate to a method including receiving a request to access a cache that includes a plurality of cachelines, and updating a priority value of at least one of the plurality of cachelines to favor eviction of unprotected cachelines of the plurality of cachelines based on the request, the priority value describing an order in which the plurality of cachelines are evicted in response to cache misses.

In some aspects, the techniques described herein relate to a method, further including initializing the plurality of cachelines to include information describing at least some of the plurality cachelines that are protected cachelines based on instructions of a computational task performed by a processor from which the request was received.

In some aspects, the techniques described herein relate to a method, wherein updating the priority of the at least one of the plurality of cachelines includes incrementing the priority value of the at least one of the plurality of cachelines in response to a cache hit for the request.

In some aspects, the techniques described herein relate to a method, wherein incrementing the priority value of the at least one of the plurality of cachelines includes incrementing the priority value of the at least one of the plurality of cachelines to an unprotected threshold value responsive to the at least one of the plurality of cachelines being an unprotected cacheline, or incrementing the priority value of the at least one of the plurality of cachelines to a protected threshold value responsive to the at least one of the plurality of cachelines being a protected cacheline.

In some aspects, the techniques described herein relate to a method, wherein updating the priority value of the at least one of the plurality of cachelines includes decrementing the priority value of the at least one of the plurality of cachelines in response to a cache miss for the request.

In some aspects, the techniques described herein relate to a method, wherein updating the priority value of the at least one of the plurality of cachelines is performed independent of modifying a priority value of a protected cacheline of the plurality of cachelines.

In some aspects, the techniques described herein relate to a method including receiving a request to access data, identifying that the request results in a cache miss for a cache that includes a plurality of cachelines, adjusting a priority value for at least one unprotected cacheline of the plurality of cachelines towards an eviction threshold value, independent of adjusting a priority value for at least one protected cacheline of the plurality of cachelines, until the priority value for the at least one unprotected cacheline satisfies the eviction threshold value, and evicting data stored in the at least one unprotected cacheline responsive to the at least one unprotected cacheline satisfying the eviction threshold value.

FIG. 1 is a block diagram of a non-limiting example system 100 having a cache and a controller with a guided cache replacement policy according to some implementations. In particular, the system includes cache 102, cache client 104, data store 106, and controller 108, which includes cache replacement policy 110 that is guided by guiding logic 112. In accordance with the described techniques, the cache 102 the cache client 104, and the data store 106 are coupled to one another via a wired connection, a wireless connection, or combinations thereof. Example wired connections include, but are not limited to, buses connecting two or more of the cache 102, the cache client 104, and the data store 106. Example wireless connections include radio, cellular, Wi-Fi, Bluetooth, near-field communication (NFC), 5G, and similar data communication pathways connecting two or more of the cache 102, the cache client 104, and the data store 106.

The cache 102 is a hardware component, software component, or a combination thereof, that stores data (e.g., at least temporarily) so that a future request for the data is served faster from the cache 102 than from the data store 106. In one or more implementations, the cache 102 is at least one of smaller than the data store 106, faster at serving data to the cache client 104 than the data store 106, or more efficient at serving data to the cache client 104 than the data store 106. Additionally or alternatively, the cache 102 is located closer to the cache client 104 than is the data store 106. In this manner, the cache 102 has additional or different characteristics which make serving at least some data to the cache client 104 from the cache 102 advantageous (e.g., relative to serving the same data from the data store 106).

In one or more implementations, the cache 102 is a memory cache, such as a particular level of cache (e.g., L1 cache) where the particular level is included in a hierarchy of multiple cache levels (e.g., L0, L1, L2, L3, and L4). In some variations, the cache 102 is a hardware component built into, and used by, the cache client 104. In other examples, the cache 102 is implemented at least partially in software, such as in at least one scenario where the cache client 104 is a web browser or a web server. The cache 102 is also implementable in different ways without departing from the spirit or scope of the described techniques.

The cache client 104 is a component that requests access to data for performing one or more operations in relation to such data. Examples of the cache client 104 include, but are not limited to, a central processing unit, a parallel accelerated processor (e.g., a graphics processing unit), a digital signal processor, a hardware accelerator, an operating system, a web browser, a web server, and a lower-level cache (e.g., a lower-level in a cache hierarchy than the cache 102), to name just a few.

In various implementations, the cache client 104 provides a request 114 for access to data. By way of example, the request 114 is a request for write access to the data or a request for read access to the data. In accordance with the described techniques, the request 114 is received to access the cache to attempt to find the data in the cache 102. For example, the request 114 is received by the controller 108. Responsive to the request 114, for instance, the controller 108 searches the cache 102 to determine if the data is stored in the cache 102. If, by searching the cache 102, the controller 108 identifies that the data is stored in the cache 102, then the controller 108 provides access to the data in the cache 102. As described herein, a "cache hit" occurs when the controller 108 identifies that the data (e.g., requested by the request 114) is stored in the cache 102. When the request 114 is for write access on a cache hit, the controller 108 modifies (e.g., updates) the data in the cache 102 that is identified by the request 114. When the request 114 is for read access, on a cache hit, the controller 108 retrieves the data in the cache 102 that is identified by the request 114. In the illustrated example, data retrieved from the cache 102 based on the request 114 is depicted as cached data 116. The controller 108 provides the cached data 116 to the cache client 104.

The illustrated example also depicts requested data 118. The requested data 118 corresponds to the data provided to the cache client 104 responsive to the request 114. When the data identified in the request 114 is served from the cache 102, on a cache hit for example, the requested data 118 corresponds to the cached data 116. In one or more scenarios, though, the data identified in the request 114 is served from the data store 106. In a scenario where the data is not found in the cache 102 and is flagged as being stored in a non-cacheable location of the data store 106, for instance, the requested data 118 corresponds to data provided to the cache client 104 from the data store 106. As described herein, a "cache miss" occurs when the controller 108 does not identify the data, identified by the request 114, in the cache 102. A cache miss occurs, for example, when the data identified by the request 114 has not yet been loaded into the cache 102 or when the data identified by the request 114 was evicted from the cache 102 prior to the request 114.

In various scenarios, the controller 108 loads the data identified by the request from the data store 106 into the cache 102 responsive to a cache miss. In the illustrated example, data retrieved from the data store 106 and loaded into the cache 102 is depicted as data store data 120. When a cache miss is determined, for instance, the data requested by the request 114 is identified in the data store 106 and is loaded from the data store 106 into one or more "locations" in the cache 102 (e.g., into one or more cachelines of the cache 102). This enables future requests for the data to be served from the cache 102 rather than from the data store 106. As discussed in more detail below, the controller 108 loads the data from the data store 106 (e.g., the data store data 120) into the cache 102 based on the cache replacement policy 110.

In accordance with the described techniques, the data store 106 is a computer-readable storage medium that stores data. Examples of the data store 106 include, but are not limited to, main memory (e.g., random access memory), a higher-level cache (e.g., L2 cache when the cache 102 is an L1 cache), secondary storage (e.g., a mass storage device), and removable media (e.g., flash drives, memory cards, compact discs, and digital video disc), to name just a few. Examples of the data store 106 also include virtual memory, which leverages underlying secondary storage of a computing device according to one or more memory management techniques. Although described herein in the context of some example configurations, the data store 106 is configurable in a variety of ways without departing from the spirit or scope of the described techniques.

As mentioned above, the controller 108 loads data into the cache 102 from the data store 106 (e.g., responsive to a cache miss). Specifically, the controller 108 loads the data according to the cache replacement policy 110. The cache replacement policy 110 controls which cachelines of the cache 102 have their previous data evicted and loaded with the data from the data store 106 that corresponds to the request 114. In one or more implementations, the cache replacement policy 110 is or includes a hardware-maintained structure that manages replacement of cachelines according to an underlying algorithm (e.g., guiding logic 112). Alternatively or in addition, the cache replacement policy 110 is or includes a computer program that manages replacement of the cachelines according to the underlying algorithm (e.g., guiding logic 112).

In accordance with the described techniques, the guiding logic 112 guides decisions of an algorithm of the cache replacement policy 110 made in connection with selecting a cacheline for evicting and loading data. For example, the guiding logic 112 assigns priority values to different cachelines of the cache 102 based on data stored in a respective cacheline. In some implementations, the guiding logic 112 is generated or otherwise controlled by instructions of an application or other computational task executed by a processor that requests data from the cache 102 (e.g., the cache client 104). For instance, the guiding logic 112 includes information specifying that certain data objects and/or certain data locations are indicated as being protected for a given computational task (e.g., information encoded in one or more instructions of a computational task specifying that the certain data objects and locations are important for the computational task). In response to loading of a protected content object, or data retrieved from a protected data storage location, into a cacheline of cache 102 the guiding logic assigns data to the cacheline (e.g., one or more bits of the cacheline) indicating that the cacheline is protected and contrasted with unprotected cachelines of the cache 102.

The guiding logic 112 causes the priority value of a cacheline to be increased or otherwise adjusted towards a maximum priority value in implementations where the request 114 results in a cache hit. Similarly, the guiding logic 112 causes the priority value of cachelines to be decremented or otherwise adjusted towards a minimum priority value in implementations where the request 114 results in a cache miss. The guiding logic 112, in some example implementations, causes adjusting priority values of unprotected cachelines towards the minimum priority value independent of (e.g., without) adjusting priority values of protected cachelines. In these example implementations, the guiding logic 112 favors maintaining data stored using protected cachelines in cache 102 over unprotected cachelines (e.g., responsive to the request 114 causing a cache miss).

The guiding logic 112 is implementable in various ways in accordance with the described techniques. For example, the guiding logic 112 is implemented in software, such as by injecting additional code into code which implements the super-temporal eviction algorithm of the cache replacement policy 110. In at least one such example, the additional code causes priority values for cachelines of the cache 102 to be adjusted based on serving requests. For instance, the additional code causes priority value for cachelines of a cache 102 to be adjusted differently based on whether the request 114 results in a cache hit or a cache miss. Alternatively or additionally, the guiding logic 112 is implemented by one or more hardware components. For example, the guiding logic 112 is implemented by one or more hardware components (e.g., by one or more integrated circuits) that implements the cache replacement policy 110 according to a super-temporal eviction algorithm.

Although the cache replacement policy 110 is depicted including the guiding logic 112 in the illustrated example, in one or more implementations the guiding logic 112 is not included as part of the cache replacement policy 110 but is accessible by the cache replacement policy 110, such as while identifying a cacheline to select for evicting and loading data. The guiding logic 112 is implemented in different ways in one or more implementations without departing from the spirit or scope of the described techniques.

As described in further detail below, the guiding logic 112 and the cache replacement policy 110 are collectively representative of a cache retention system that favors preservation of protected cachelines in cache over unprotected cachelines, responsive to a cache miss. Example implementations in which the cache replacement policy 110 and guiding logic 112 are configured is described in further detail below with respect to FIGS. 2-5.

Figure 2:
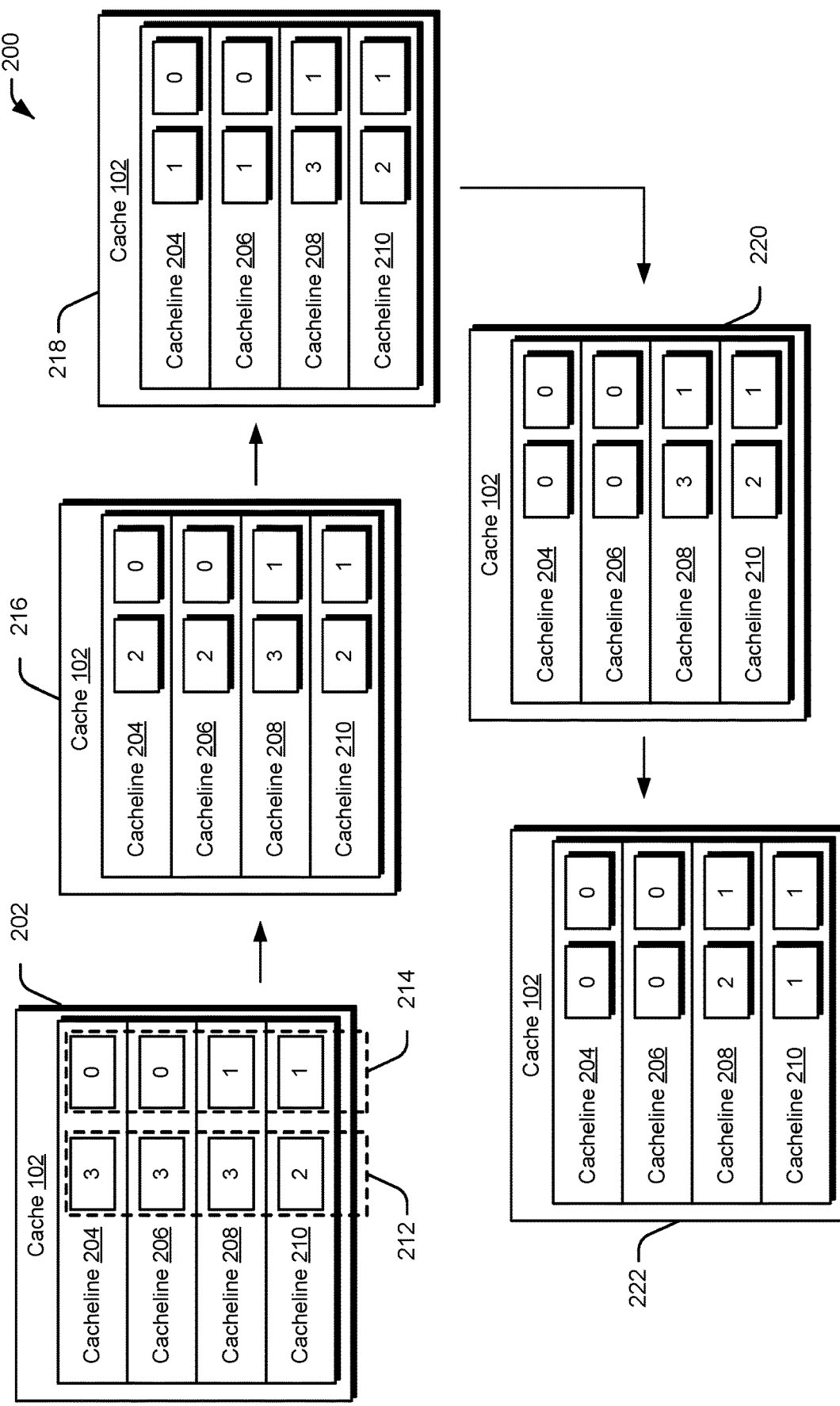
FIG. 2 depicts a non-limiting example in which cacheline priority values for protected and unprotected cachelines are updated according to a guided cache replacement policy in accordance with one or more implementations.

FIG. 2 depicts an example 200 in which cacheline priority values for protected and unprotected cachelines are updated according to a guided cache replacement policy in accordance with one or more implementations.

In the illustrated example 200, cache 102 is depicted in a first state 202 as including cacheline 204, cacheline 206, cacheline 208, and cacheline 210. Although depicted as including four cachelines in the example 200 for simplicity, the cache 102 is representative of a cache having any suitable number of cachelines (e.g., two or more cachelines) in accordance with the techniques described herein and the illustrated example is not limiting. Each cacheline of the cache 102 is depicted as being associated with corresponding one of the priority values 212 and a corresponding one of the protected indicators 214. The priority values 212 are configurable in any suitable manner, such as one or more bits of data associated with (e.g., included in, appended to, etc.) the cacheline, and represents information describing a relative priority by which the cacheline should be maintained in the cache 102 (e.g., relative to other cachelines of the cache 102 in an event where eviction of a cacheline is necessary). In a similar manner, the protected indicators 214 are configurable in any suitable manner, such as a single bit that provides a binary indication (e.g., one or zero) as to whether the cacheline should be treated as more important to maintain in the cache 102 relative to unprotected cachelines. In implementations, cachelines having associated protected indicators 214 that identify the cachelines as being important are referred to as "super-temporal" cachelines, which denotes how the cachelines are intended for preservation in the cache 102 for an extended duration of time.

As depicted in the illustrated example 200, in the first state 202, cacheline 204 is assigned a priority value of three, cacheline 206 is assigned a priority value of three, cacheline 208 is assigned a priority value of three, and cacheline 210 is assigned a priority value of two. In the first state 202, cacheline 204 has a protected value of zero, cacheline 206 has a protected value of zero, cacheline 208 has a protected value of one, and cacheline 210 has a protected value of one. The protected indicators 214 thus indicates that cacheline 204 and cacheline 206 are not to be considered as protected, and further indicates that cacheline 208 and cacheline 210 are to be protected (e.g., that cacheline 204 and cacheline 206 are unimportant relative to cacheline 208 and cacheline 210).

In accordance with the techniques described herein, individual cachelines of the cache 102 can be assigned a respective protected value, a respective priority value, or a combination thereof, in a variety of manners.

For instance, in some implementations individual cachelines are assigned a protected value based on a computational task being executed by a source from which the request 114 is received (e.g., protected values are assigned by application code of a computer application being executed by the cache client 104, where executing the computer application involves processing requested data 118). In such an example scenario, a developer of a computer program or author of code executed as part of performing a computational task is able to pre-define (e.g., at compile time or prior to runtime of the computational task) one or more data objects, one or more locations in data store 106, or combinations thereof, that should be treated as protected or important during performance of the computational task.

Continuing this example scenario, when a data object indicated as being important is loaded into the cache 102, one or more cachelines used to store the important data object are configured with a protected indicators 214 that identify this importance (e.g., one or more cachelines used to store the data objects identified as protected are configured to include a "protected value bit" as having a value of one instead of a value of zero). Alternatively or additionally, the techniques described herein enable a programmer or computational task developer to specify at least one memory region (e.g., one or more storage locations in the data store 106) as being important and thus protected for continued storage in the cache 102. For instance, consider an example scenario where a developer authors executable code for a computational task to store data objects (e.g., data objects that are frequently and/or repeatedly used as part of performing the computational task) in a certain region of memory.

In this example scenario, the techniques described herein enable to developer to provide information (e.g., as part of the guiding logic 112) indicating that the certain region of memory stores important data during performance of the computational task. Such an indication informs the controller 108 that data retrieved from the certain region of memory should be prioritized for continued storage in the cache 102 (e.g., relative to data retrieved from regions in memory other than the certain region of memory indicated as important by the guiding logic 112). In this manner, the controller 108 is configured to identify which cachelines of the cache 102 are to be treated as storing important data, assign the corresponding cachelines with protected indicators 214 that represent this importance, and thus prioritize the cachelines for preservation in the cache 102. Information describing data objects, data storage locations, or combinations thereof to be prioritized for maintenance in the cache 102 is configurable in a variety of manners.

For instance, important or "protected" data and/or data storage information is included in application code of a computational task performed by the cache client 104. Alternatively or additionally, protected information is stored in hardware registers of the system 100, via one or more bits in a page table entry that are communicated to the controller 108 along with a request 114, and so forth. Alternatively or additionally, protected information for cachelines of the cache 102 is included in buffer descriptors (e.g., application or computational task-specific metadata) that are associated with data allocations and loaded into the controller 108 before the system 100 executes instructions involved with buffering data from memory (e.g., the data store 106). Alternatively or additionally, in some implementation a determination of whether information is "protected" is made entirely by hardware. For instance hardware of the system 100 (e.g., dedicated reuse prediction hardware) observes access rates, hit rates, and other historical behavior for certain cacheline addresses or regions of cachelines and designate one or more cachelines as protected (e.g., as super-temporal), independent of any indication provided by software (e.g., an application or computational task being executed by the system 100).

The illustrated example 200 depicts how the controller 108 enforces the cache replacement policy 110 to evict certain cachelines from the cache 102 (e.g., in response to the request 114 being a cache miss) based on priority values 212 and protected indicators 214 associated with respective cachelines. As noted above, the first state 202 represents an initial state of the cache 102, such as a state of the cache 102 prior to receipt of the request 114 by the controller 108. State 216, state 218, state 220, and state 222 represent how the controller 108 follows the guiding logic 112 of the cache replacement policy 110 to resolve which cacheline should be evicted (e.g., in response to request 114 being a cache miss where a cacheline needs to be evicted to make room for storage of data store data 120 in the cache 102).

In the context of example 200, priority values 212 range from zero to three, where a priority value of zero indicates that a cacheline is eligible for eviction from the cache and a value of three represents a maximum value for prioritizing maintenance (e.g., continued storage) of the cacheline in cache 102. Although illustrated and described with respect to this specific range spanning zero to three, inclusive, the priority values 212 are configurable to span any numerical range in accordance with the techniques described herein. By spanning from zero to three, the example 200 represents an example where each of the priority values 212 can be assigned one of four different integers (e.g., zero, one, two, or three), and thus the priority values 212 are each configurable using two bits per cacheline of the cache 102. Such a two-bit priority value configuration is thus useful in prioritizing different cachelines for preservation in the cache 102 while minimizing an amount of data required to do so.

In the illustrated example 200, the cache replacement policy 110 causes the controller 108 to first iteratively decrement priority values 212 for unprotected cachelines until an unprotected cacheline has a minimum priority value (e.g., a priority value of zero indicating that the cacheline is eligible for eviction). For instance, state 216 represents how the priority values 212 of cacheline 204 and cacheline 206 are each decremented by one (e.g., from three to two), while the priority values 212 of cacheline 208 and cacheline 210 are maintained (e.g., at three and two, respectively). Because no cacheline at the first state 202 or state 216 have a priority value of zero (e.g., no cachelines are eligible for eviction), the cache replacement policy 110 causes the controller 108 to continue decrementing priority values 212 of unprotected cachelines.

For instance, state 218 represents how the priority values 212 of cacheline 204 and cacheline 206 have been decremented from two to one and state 220 represents how the priority values 212 of cacheline 204 and cacheline 206 have been decremented from one to zero. Conversely, the priority values 212 or cacheline 208 and cacheline 210 are maintained from first state 202 through state 216, state 218, and state 220 due to having an associated protected indicator of one (e.g., contrasted with the unprotected value of zero assigned to cacheline 204 and cacheline 206). Upon reaching state 222, where cacheline 204 and cacheline 206 are each associated with a priority value of zero, the controller 108 evicts one of the cachelines having a priority value of zero.

In implementations, in scenarios where the cache 102 includes multiple cachelines that are candidates for eviction (e.g., multiple cachelines having an associated minimum priority value), the controller 108 selects which cacheline to evict based on a way index of the cacheline. As described herein, a cache way index refers to a mechanism of the cache 102 to determine the location of data within the cache. In some implementations, the controller 108 selects a cacheline having a lowest way index as the cacheline to be evicted. For instance, in the illustrated example of FIG. 2, if cacheline 204 has a lower way index than cacheline 206, then cacheline 204 is selected for eviction due to having a lowest way index among cachelines having a minimum priority value (e.g., a priority value of zero). An example flow of operations performed by the controller 108 in enforcing the cache replacement policy 110 illustrated with respect to FIG. 2 is described in further detail below with respect to FIG. 3.

Figure 3:
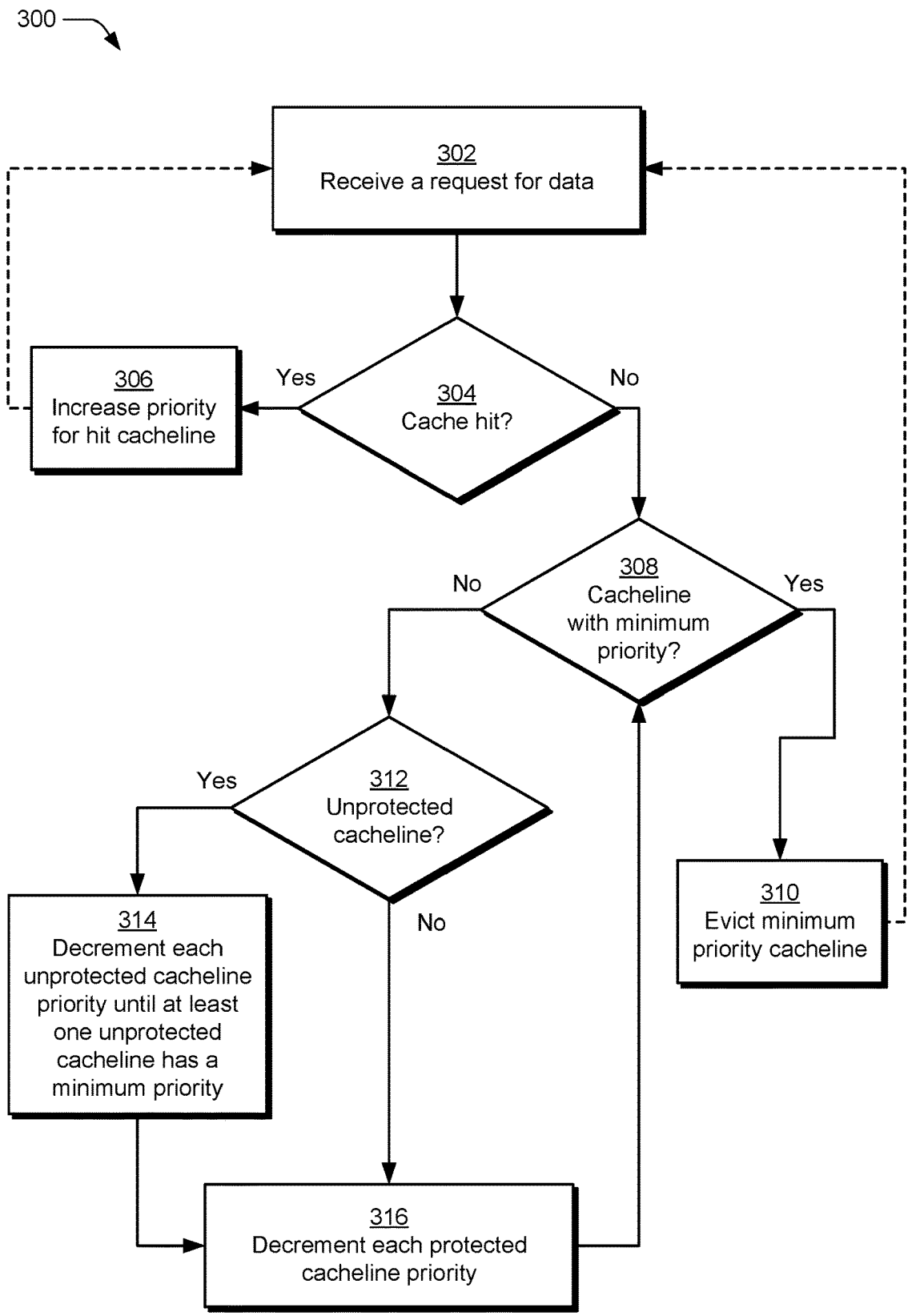
FIG. 3 depicts a procedure in an example implementation of modifying priority values for protected and unprotected cachelines and evicting cachelines based on their priority values in accordance with aspects of the techniques described herein.

FIG. 3 depicts a procedure 300 for modifying priority values for protected and unprotected cachelines and evicting cachelines based on their priority values.

To begin, a request for data is received (block 302). The controller 108, for instance, receives request 114 from the cache client 104. In response to receiving the request for data, a determination is made as to whether the request resulted in a cache hit (block 304). The controller 108, for instance, identifies whether data requested by the cache client 104 is stored in the cache 102. In response to determining that the request 114 results in a cache hit (e.g., a "Yes" determination at block 304 based on identifying that requested data is stored in the cache 102), a priority value for the hit cacheline is increased (block 306).

The controller 108, for instance, identifies a cacheline storing data requested by the request 114 and increases a respective one of the priority values 212 corresponding to the cacheline that stores the requested data. In some implementations, the controller 108 increases the priority value for a hit cacheline to a maximum priority value. For instance, with respect to the illustrated example of FIG. 2, in response to the request 114 being a request for data stored in cacheline 210, the controller 108 increases the priority value of cacheline 210 from two to three. Alternatively, in some implementations the controller 108 increments the priority value for a hit cacheline to a value that is less than a maximum priority value. For instance, the controller 108 increments the priority value for a hit cacheline by a single integer value or by multiple integer values to be less than the maximum priority value.

In some implementations, the request 114 is received together with an indication as to whether or not the data access request is super-temporal (e.g., via one or more bits appended to the request 114). In such an implementation, detecting a cache hit at block 304 results in adjusting the priority value for the hit cacheline in any suitable manner, such as by adjusting the priority value to downgrade a cacheline from super-temporal to non-super-temporal or by adjusting the priority value to upgrade a non-super-temporal cacheline to having super-temporal status. For instance, in an example implementation where the request 114 is received with an indication that the request is super-temporal, and the cacheline hit at block 304 was previously associated with a non-super-temporal priority value, the controller 108 is caused to increase the priority value for the cacheline at block 306 to a super-temporal priority value. As another example, consider a scenario where the request 114 is received with an indication that the data access request is not super-temporal and the hit cacheline is associated with a super-temporal priority value. In such a scenario, the controller 108 is caused to adjust the priority value for the hit cacheline to a non-super-temporal value (e.g., a value at or near an upper limit for a non-super-temporal priority value range. Thus, block 306 represents functionality of the controller 108 adjusting a priority value for a hit cacheline to any suitable value.

Alternatively, in response to identifying that the request 114 does not result in a cache hit (e.g., a "No" determination at block 304 in response to identifying that the request 114 results in a cache miss due to the requested data not being stored in the cache 102), a determination is made as to whether a cacheline has a minimum priority value (block 308). The controller 108, for instance, checks whether a cacheline of cache 102 is associated with a minimum priority value (e.g., a priority value of zero with respect to the example 200). In response to identifying that a cacheline is currently associated with a minimum priority value (e.g., a "Yes" determination at block 308), the cacheline with the minimum priority value is evicted from the cache (block 310). The controller 108, for instance, identifies cacheline 204 and cacheline 206 as being associated with a minimum priority value of zero and selects cacheline 204 for eviction, such that data requested by the request 114 (e.g., data store data 120) can be stored in cache 102 in place of data previously occupying cacheline 204.

Alternatively, in response to identifying that no cacheline is currently associated with a minimum priority value (e.g., a "No" determination at block 308), a determination is made as to whether the cache includes at least one unprotected cacheline (block 312). In response to identifying that a cache includes at least one protected cacheline (e.g., a "Yes" determination at block 312), a priority value of each unprotected cacheline is decremented until at least one unprotected cacheline has a minimum priority (block 314). The controller 108, for instance, identifies that the cache 102 includes at least one cacheline having an associated priority value of zero. In response to identifying that at least one cacheline has a minimum associated priority value (e.g., zero), the controller 108 iteratively decrements priority values of all unprotected cachelines as represented by the progression from the first state 202, to the state 216, to the state 218, to the state 220 of FIG. 2, where cacheline 204 and cacheline 206 each have a minimum priority value of zero.

After decrementing priority values of each unprotected cacheline until at least one unprotected cacheline has a priority value of zero, or in response to identifying that no cachelines in a cache are unprotected (e.g., a "No" determination at block 312), a priority value of each protected cacheline is decremented (block 316). The controller 108, for instance, decrements a priority value for protected cacheline 208 and protected cacheline 210, as represented by the progression from state 220 to state 222 in FIG. 2. By forcing the controller 108 to decrement of a priority value for each protected cacheline after decrementing priority values for unprotected cachelines until at least one unprotected cacheline is in condition for eviction (e.g., has a minimum priority value), the cache replacement policy 110 avoids a scenario where a protected cacheline is maintained in cache 102 forever, and thus avoids buildup of cache plaque or a scenario where a computational task otherwise inadvertently instructs all data to be kept in cache for perpetuity.

After decrementing a priority value for each protected cacheline, operation of procedure 300 then returns to block 308. This return to block 308 then enables progression to block 310 after decrementing the priority value for at least one unprotected cacheline to a minimum priority value. Alternatively, this also accounts for a scenario where all cachelines of a cache are protected, and operation of procedure 300 continues until at least one cacheline-either protected or unprotected-has a minimum associated priority value, at which point the cacheline is evicted at block 310. The procedure 300 is configured to repeat upon receipt of subsequent requests 114, for any number of requests received by the controller 108, as indicated by the dashed arrows returning to block 302 from block 306 and block 310.

Although described above in the context of having a separate indicator (e.g., a separate protected indicator) that describes whether respective cachelines are protected (e.g., super-temporal cachelines) to be prioritized for maintenance in the cache over unprotected cachelines, in some implementations this protected information is included in priority information for a cacheline. By encoding cacheline protection information into a priority identifier, some implementations thus avoid having to designate certain bits of a cacheline to denoting whether a cacheline is super-temporal or not. For a further description of how protection information for a cacheline is encoded into a priority value for the cacheline, consider FIGS. 4 and 5.

Figure 4:
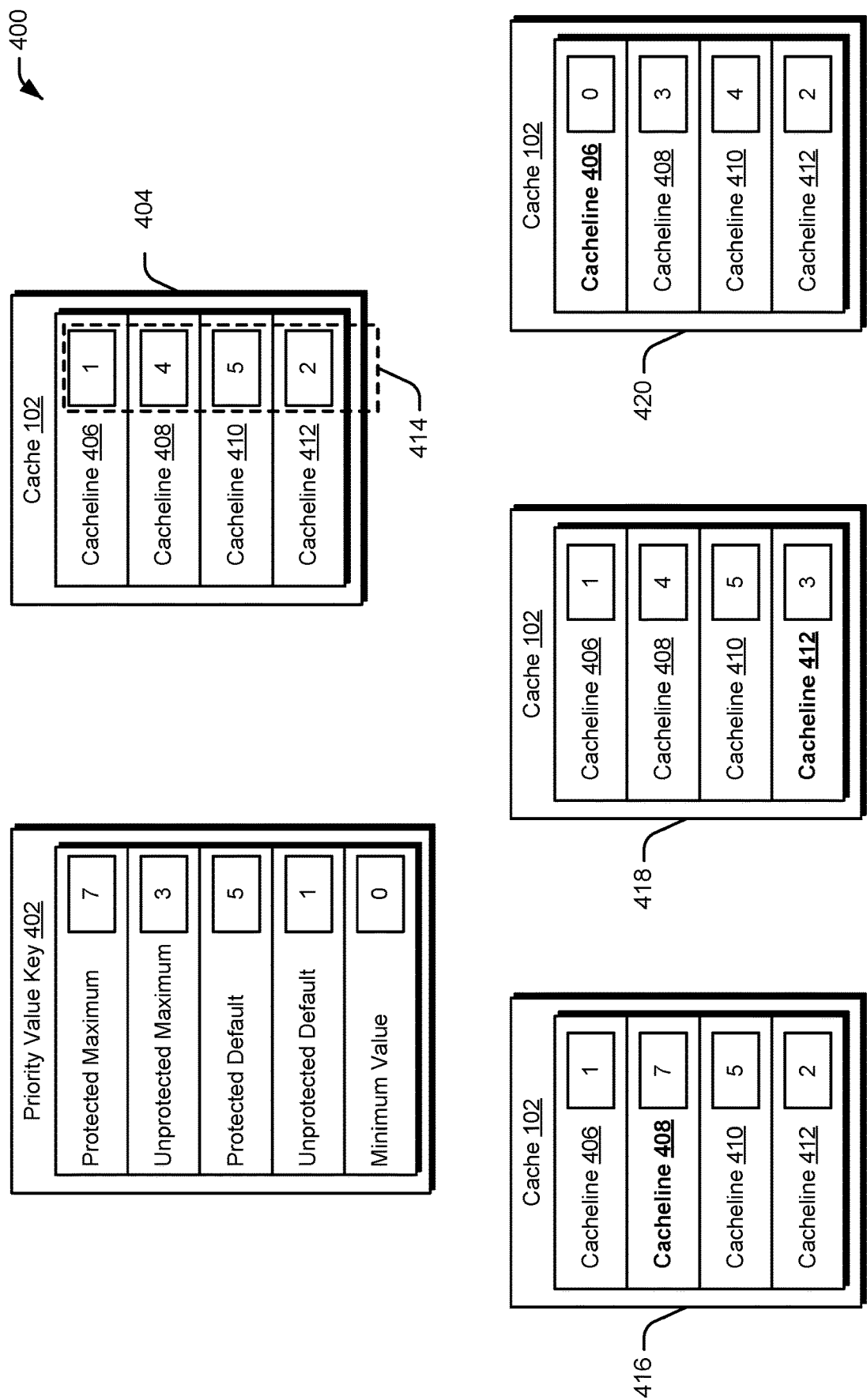
FIG. 4 depicts a non-limiting example in which cacheline priority values are updated relative to default and maximum thresholds for protected and unprotected cachelines in accordance with one or more implementations.

FIG. 4 depicts an example 400 in which cacheline priority values are updated relative to default and maximum thresholds for protected and unprotected cachelines in accordance with one or more implementations. In the illustrated example 400, priority value key 402 includes information representing how different priority values are assigned to protected and unprotected cachelines in accordance with the cache replacement policy 110. Specifically, priority value key 402 denotes that a priority value of seven represents a maximum priority value eligible for assignment to protected cachelines. Priority value key 402 further indicates that a priority value of three represents a maximum priority value eligible for assignment to unprotected cachelines.

Priority value key 402 further describes how protected cachelines, upon insertion (e.g., upon being written to cache 102) are assigned a default value of five and how unprotected cachelines are assigned a default value of one upon insertion into the cache. Finally, priority value key 402 indicates that a minimum cacheline priority value of zero represents when cachelines are eligible for eviction (e.g., in response to the request 114 being a cache miss). In this manner, priority value key 402 effectively defines different ranges of priority values for protected cachelines (e.g., super-temporal cachelines) and unprotected cachelines (e.g., non-super temporal cachelines or super-temporal cachelines that have aged out). Specifically, priority value key 402 defines that cachelines having priority values from four to seven are super-temporal and to be protected or otherwise preserved in the cache 102. Conversely, priority value key 402 defines that cachelines having priority values from zero to three are either not super-temporal cachelines or instances of super-temporal cachelines that have aged to lose their super-temporal status and are to be evicted from cache 102 more favorably relative to super-temporal cachelines.

In the context of priority value key 402, state 404 represents an example state of cache 102 where priority values 414 are useable to define a priority by which different cachelines are maintained in the cache 102 while also accounting for whether a certain cacheline should be designated as protected (e.g., as instructed by program code of a computational task that involves request 114). Specifically, state 404 illustrates how the cache 102 includes cacheline 406 having a priority value of one, includes cacheline 408 having a priority value of four, includes cacheline 410 having a priority value of five, and includes cacheline 412 having a priority value of two.

In implementations, the cache replacement policy 110 causes the controller 108 to update the respective priority values of cacheline 406, cacheline 408, cacheline 410, and cacheline 412 based on a result of request 114. For instance, in implementations where the request 114 results in a cache hit, the cache replacement policy 110 causes the cache replacement policy 110 to increment a priority value associated with the cacheline that includes data requested by the request 114. In some implementations, the controller 108 increments the cacheline priority value relative to the cacheline's current priority value. For instance, in implementations where the cacheline priority value indicates that the cacheline should be protected (e.g., where the cacheline priority value is greater than the maximum priority value assignable to unprotected cachelines), the controller 108 is caused to increment the cacheline priority value to the unprotected maximum priority value.

For instance, in response to identifying that data requested by request 114 is stored in cacheline 408, the controller 108 identifies that cacheline 408 previously had a priority value of four, which is greater than the maximum priority value for unprotected cachelines (e.g., as indicated by state 404 relative to priority value key 402). In response to such an identification, the cache replacement policy 110 causes the controller 108 to increment to the priority value of cacheline 408 to the maximum priority value of seven (e.g., for protected cachelines as specified by priority value key 402), which results in state 416 of cache 102.

As an alternative example, in response to identifying that data requested by request 114 is stored in cacheline 412, the controller 108 identifies that cacheline 412 previously had a priority value of two, which is less than the maximum priority value for unprotected cachelines (e.g., as indicated by state 404 relative to priority value key 402). In response to such an identification, the cache replacement policy 110 causes the controller 108 to increment the priority value of block 312 to the maximum priority value of three (e.g., for unprotected cachelines as specified by priority value key 402), which results in state 418 of cache 102.

As yet another example, in response to identifying that data requested by request 114 is not stored in any cacheline of cache 102 (e.g., a cache miss), the cache replacement policy 110 causes the controller 108 to decrement a priority value of each cacheline until at least one cacheline achieves a minimum priority value and is eligible for eviction. For instance, state 420 represents a condition of cache 102 resulting from state 404 where request 114 results in a cache miss. Specifically, each of the priority values 414 are decremented, such that cacheline 406 is associated with a minimum priority value of zero, while cacheline 408, cacheline 410, and cacheline 412 each have a decremented priority value (e.g., relative to state 404) that is above the minimum priority value.

In such an example scenario, the cache replacement policy 110 causes the controller 108 to evict cacheline 406 to make room in the cache 102 for data requested by the request 114. In implementations where the requested data replacing evicted cacheline 406 is indicated as being protected, the requested data is inserted into cache 102 with a priority value of five. Alternatively, if the requested data replacing evicted cacheline 406 is not indicated as being protected, the requested data is inserted into cache 102 with a priority value of one. Example flows of operations performed by the controller 108 in enforcing the cache replacement policy 110 illustrated with respect to FIG. 4 is described in further detail below with respect to FIG. 5.

Figure 5:
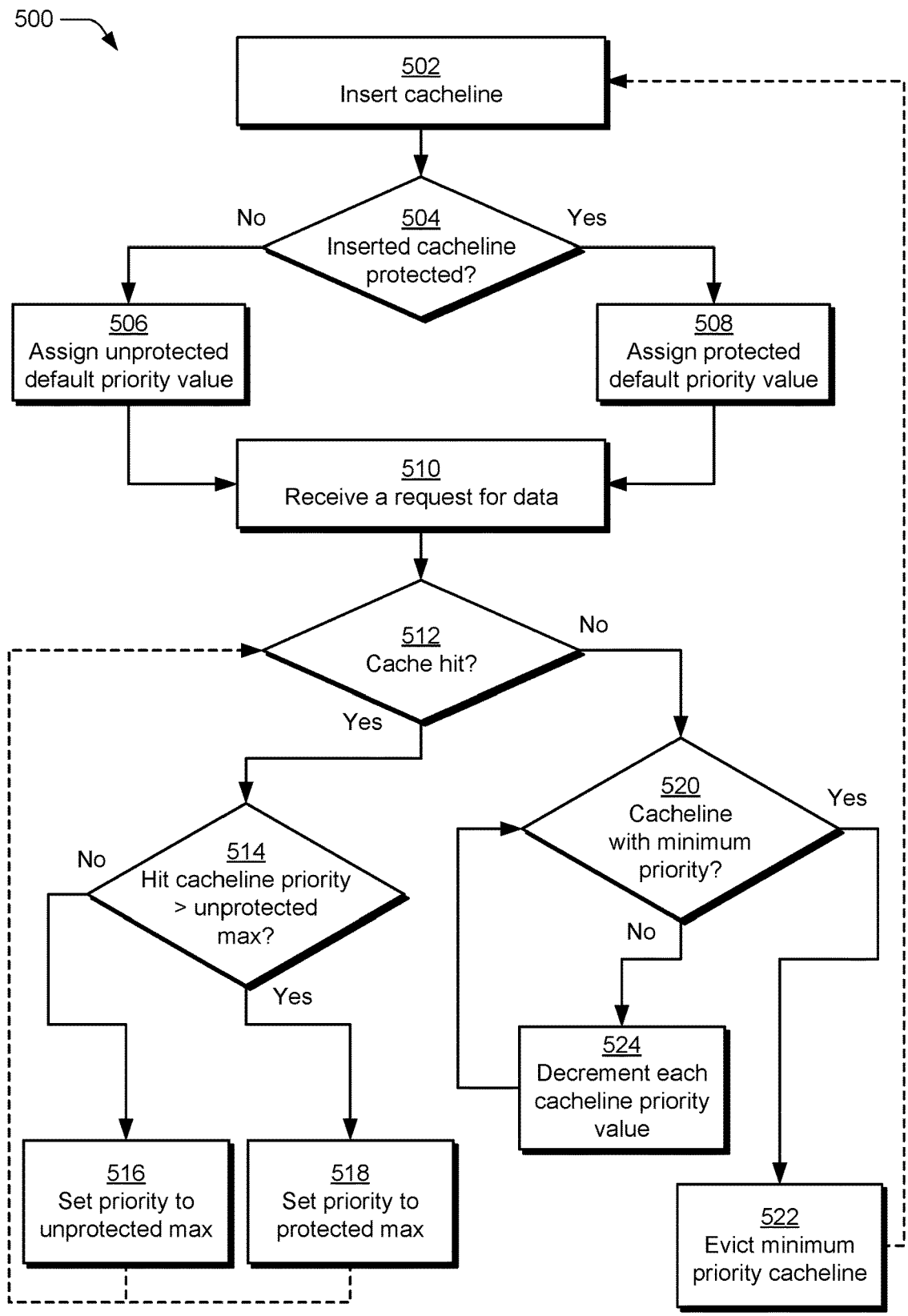
FIG. 5 depicts a procedure in an example implementation of modifying priority values for protected and unprotected cachelines and evicting cachelines based on their priority values in accordance with aspects of the techniques described herein.

FIG. 5 depicts a procedure 500 for modifying priority values for protected and unprotected cachelines and evicting cachelines based on their priority values.

To begin, a cacheline is inserted into a cache (block 502). The controller 108, for instance, initializes cache 102 by inserting data into the cache 102 as instructed by program code of a computational task being executed by the cache client 104. As a specific example, in some implementations an application developer instructs a cache to be populated with certain data objects involved in performing the computational task. As another example, the controller 108 inserts data store data 120 into a cacheline of the cache 102 (e.g., in response to the request 114 being a request for data stored in the data store 106).

For each inserted cacheline, a determination is made as to whether the inserted cacheline is protected (block 504). The guiding logic 112 of the cache replacement policy 110, for instance, informs the controller 108 as to whether data represented by the inserted cacheline is indicated as being protected for the purposes of a specific computational task performed by the cache client 104 (e.g., based on program code authored by a developer of the computational task, based on a data storage location from which data of the inserted cacheline was retrieved being defined as a protected memory location, or a combination thereof).

In response to identifying that the inserted cacheline is not designated or otherwise indicated as being a protected cacheline (e.g., a "No" determination at block 504), an unprotected default priority value is assigned to the cacheline (block 506). The controller 108, for instance, assigns the inserted cacheline to have a priority value of three, in accordance with the values of priority value key 402. Alternatively, in response to identifying that the inserted cacheline is designated or otherwise indicted as being a protected cacheline (e.g., a "Yes" determination at block 504), a protected default priority value is assigned to the cacheline (block 508). The controller 108, for instance, assigns the inserted cacheline to have a priority value of five, in accordance with the values of priority value key 402.

Operation of procedure 500 then proceeds from either block 506 or block 508 to block 510, where a request for data is received. The controller 108, for instance, receives request 114 from the cache client 104. In response to receiving the request for data, a determination is made as to whether the request resulted in a cache hit (block 512). In response to determining that the request 114 results in a cache hit (e.g., a "Yes" determination at block 512 based on identifying that requested data is stored in the cache 102), a determination is made as to whether the hit cacheline has an associated priority value that is greater than a maximum priority value for unprotected cachelines (block 514).

The controller 108, for instance, compares a priority value of a cacheline used to store data requested by the request 114 to threshold values defined by the cache replacement policy 110 (e.g., the priority values indicated in priority value key 402). In response to determining that the hit cacheline has an associated priority value that is not greater than the maximum priority value for unprotected cachelines (e.g., a "No" determination at block 514), the hit cacheline priority value is set to the unprotected maximum priority value (block 516). The controller 108, for instance, identifies that data requested by request 114 is stored in cacheline 412. The controller 108 further identifies that cacheline 412 has an associated priority value of two, which is less than the unprotected maximum priority value of three indicated by priority value key 402 at the time request 114 is received. In response to the cache hit, the controller 108 updates the cacheline 412 to have a priority value of three (e.g., the maximum priority value for unprotected cachelines), and transitions cache 102 from state 404 to state 418.

Alternatively, in response to determining that the hit cacheline has an associated priority value that is greater than—or, in some implementations, equal to—the maximum priority value for protected cachelines (e.g., a "Yes" determination at block 514), the hit cacheline priority value is set to the protected maximum priority value (block 518). The controller 108, for instance, identifies that data requested by request 114 is stored in cacheline 408. The controller 108 further identifies that cacheline 408 has an associated priority value of four, which is greater than the unprotected maximum priority value of three indicated by priority value key 402 at the time request 114 is received.

In response to the cache hit, the controller 108 updates the cacheline 408 to have a priority value of seven (e.g., the maximum priority value for protected cachelines), and transitions cache 102 from state 404 to state 416, as illustrated in FIG. 4. Alternatively, in some implementations the cache replacement policy 110 causes the controller 108 to increment priority values for hit cachelines to a value that is less than a maximum value for a protected cacheline or a maximum value for an unprotected cacheline.

In some implementations, the controller 108 is caused to deviate from the illustrated flow of FIG. 5 based on an indication as to whether a request (e.g., the request 114) is super-temporal or non-super temporal. For instance, in an example implementation where a "No" determination at block 514 otherwise causes the controller to proceed to block 516, a request received with an indication that the request is a super-temporal request causes the controller to instead proceed to block 518 and set a priority value for the hit cacheline to indicate a super-temporal priority value (e.g., a protected maximum value). Alternatively, in an example implementation where a "Yes" determination at block 514 otherwise causes the controller to proceed to block 518, a request received with an indication that the request is a non-super-temporal request causes the controller to instead proceed to block 516 and set a priority value for the hit cacheline to indicate a non-super-temporal priority value (e.g., an unprotected maximum value). In this manner, the cache replacement policy 110 is thus configurable to cause the controller 108 to update priority values for cachelines storing data actively involved in performing a computational task, such that recently used data is promoted for retention in the cache 102. Operation of procedure 500 then optionally returns to service another request, as indicated by the dashed arrows returning to block 512 from block 516 and block 518.

Alternatively, in implementations where a request (e.g., request 114) results in a cache miss (e.g., a "No" determination at block 512), a determination is made as to whether a cacheline has a minimum priority value (block 520). The controller 108, for instance, checks whether a cacheline of cache 102 is associated with a minimum priority value (e.g., a priority value of zero with respect to the example 400). In response to identifying that a cacheline is currently associated with a minimum priority value (e.g., a "Yes" determination at block 520), the cacheline with the minimum priority value is evicted from the cache (block 522). The controller 108, for instance, identifies cacheline 406 in state 420 of the cache 102 as being associated with a minimum priority value of zero and evicts data stored in cacheline 406 from the cache 102.

Alternatively, in response to identifying that no cacheline is currently associated with a minimum priority value (e.g., a "No" determination at block 520), a priority value of each cacheline is decremented (block 524). The controller 108, for instance, reduces each of the priority values 414 in cache 102 by at least one. Operation then returns to block 520 where the controller 108 again determines whether a cacheline includes a minimum priority value (e.g., resulting from the decrementing performed in block 524). This process of operations represented by block 520 and block 524 continues until at least one cacheline is associated with a minimum priority value, at which point the cacheline with the minimum priority value is evicted from the cache (block 522). Operation of procedure 500 then optionally returns to block 502 where, for instance, data that was requested by the request 114 is inserted as a cacheline into cache 102 in place of the cacheline evicted at block 522.

In this manner, guiding logic 112 of the cache replacement policy 110 is configurable in a manner such that individual cachelines can be associated with extended bit information (e.g., data encoded in two or more bits) describing priority for cacheline retention. Such extended bit information enables for defining thresholds in a program-specific manner to create a policy that encourages retention of important data—and/or data retrieved from protected memory locations—to curate a tailored cache management policy for a particular computational task, independent of (e.g., without) requiring a separate protected/unprotected indicator. With respect to the examples described and illustrated in the context of FIGS. 4 and 5, such information can be encoded using only three bits per cacheline.

Alternatively, in an example implementation more than three bits per cacheline are utilized to define a custom cache replacement policy for a computational task. For instance, in one example implementation each cacheline includes a binary protected bit indicator and three or more bits that represent a priority value for the cacheline. Alternatively or additionally, in some implementations each cacheline is configured with information that defines a counter which represents a maximum number of requests (e.g., a maximum number of requests 114) over which a cacheline is permitted to be retained in cache 102 (e.g., independent of an associated priority value for the cacheline). As yet another example, in some implementations prefetched data is inserted into the cache 102 with associated priority values that are defined as a condition of being prefetched. For instance, in one specific example data that is prefetched by the system 100 (e.g., inserted into the cache 102 prior to a request 114 for the data) is assigned a priority value indicating that the data is to be treated as protected (e.g., to avoid inadvertent flushing from the cache 102 before the prefetched data is actually used).

Many variations are possible based on the disclosure herein. Although features and elements are described above in particular combinations, each feature or element is usable alone without the other features and elements or in various combinations with or without other features and elements. For example, aspects of the guiding logic described herein are configurable to form part of the cache replacement policy. That is, the cache replacement policy includes the guiding logic described herein.

The various functional units illustrated in the figures and/or described herein (including, where appropriate, the cache 102, the cache client 104, the data store 106, the controller 108, the cache replacement policy 110, and the guiding logic 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   a cache that includes a cacheline having a bit indicating whether the cacheline is protected by a computational task or unprotected, wherein protected cachelines are eligible for eviction;
   guiding logic to guide decisions of a cache replacement policy by favoring eviction of unprotected cachelines over eviction of the protected cachelines; and
   a controller to select a cacheline of the cache to evict responsive to a cache miss based on the cache replacement policy and the guiding logic.

2. The system of claim 1, wherein the controller is further configured to:
   evict previous data stored in the cacheline; and
   load data into the cacheline, wherein the data loaded into the cacheline is retrieved for a request that caused the cache miss.

3. The system of claim 1, wherein the guiding logic is generated based on instructions of an application executed by a processor that requests data from the cache.

4. The system of claim 1, wherein the guiding logic includes information specifying at least one data object and the controller is configured to designate a cacheline that stores the at least one data object as being protected based on the guiding logic.

5. The system of claim 1, wherein the guiding logic includes information specifying at least one data storage location and the controller is configured to designate a cacheline that stores data retrieved from the at least one data storage location as being protected based on the guiding logic.

6. The system of claim 1, wherein the controller is further configured to:
   receive a first request for data;
   identify that the data requested by the first request is stored in a first cacheline of the cache;
   return the data requested by the first request to a source from which the first request was received; and
   increment a priority value of the first cacheline.

7. The system of claim 1, wherein the controller is further configured to:
   receive a second request for data;
   identify that the data requested by the second request is not stored in the cache and that the second request caused the cache miss; and
   identify a second cacheline as having a priority value that permits eviction, wherein the second cacheline is selected to evict responsive to the cache miss.

8. The system of claim 1, wherein responsive to the cache miss, the guiding logic causes the controller to:
   identify, from the cache replacement policy, a priority value threshold for eviction;
   identify that each cacheline of the cache is associated with a priority value that does not satisfy the priority value threshold; and
   decrement, a priority value associated with one of the unprotected cachelines until the priority value associated with the one of the unprotected cachelines satisfies the priority value threshold that for eviction.

9. The system of claim 8, wherein the controller decrements the priority value associated with the one of the unprotected cachelines independent of modifying a priority value associated with one or more of the protected cachelines.

10. The system of claim 8, wherein responsive to decrementing the priority value associated with the one of the unprotected cachelines, at least two of the unprotected cachelines have associated priority values that satisfy the priority value threshold for eviction, wherein the guiding logic further causes the controller to select one of the at least two unprotected cachelines for data eviction based on addresses of the at least two unprotected cachelines.

11. The system of claim 1, wherein the cache replacement policy controls loading data into the cache by causing the controller to:
   assign a default unprotected value to data loaded into the cache responsive to the data being loaded from a data storage location indicated as unprotected by the guiding logic; or
   assign a default protected to data loaded into the cache responsive to the data being loaded from a data storage location indicated as protected by the guiding logic.

12. The system of claim 1, wherein the computational task comprises application code of an application being executed by the system, the application code defining at least one of a data object or a location in a data store to be protected during execution of the application code.

13. A method comprising:
   receiving a request to access a cache that includes a plurality of cachelines, each of the plurality of cachelines including a bit indicating whether the cacheline is protected by a computational task or unprotected, wherein protected cachelines of the plurality of cachelines are eligible for eviction; and
   updating a priority value of at least one of the plurality of cachelines to favor eviction of unprotected cachelines of the plurality of cachelines based on the request, the priority value describing an order in which the plurality of cachelines are evicted in response to cache misses.

14. The method of claim 13, further comprising initializing the plurality of cachelines to include information describing at least some of the plurality cachelines that are the protected cachelines based on instructions of a computational task performed by a processor from which the request was received.

15. The method of claim 13, wherein updating the priority of the at least one of the plurality of cachelines comprises incrementing the priority value of the at least one of the plurality of cachelines in response to a cache hit for the request.

16. The method of claim 15, wherein incrementing the priority value of the at least one of the plurality of cachelines comprises:
  incrementing the priority value of the at least one of the plurality of cachelines to an unprotected threshold value responsive to the at least one of the plurality of cachelines being one of the unprotected cachelines; or
  incrementing the priority value of the at least one of the plurality of cachelines to a protected threshold value responsive to the at least one of the plurality of cachelines being one of the protected cachelines.

17. The method of claim 13, wherein updating the priority value of the at least one of the plurality of cachelines comprises decrementing the priority value of the at least one of the plurality of cachelines in response to a cache miss for the request.

18. The method of claim 17, wherein updating the priority value of the at least one of the plurality of cachelines is performed independent of modifying a priority value of one or more of the plurality of protected cachelines.

19. A method comprising:
  receiving a request to access data;
  identifying that the request results in a cache miss for a cache that includes a plurality of cachelines;
  adjusting a priority value for at least one unprotected cacheline of the plurality of cachelines towards an eviction threshold value, independent of adjusting a priority value for at least one protected cacheline of the plurality of cachelines, until the priority value for the at least one unprotected cacheline satisfies the eviction threshold value; and
  evicting data stored in the at least one unprotected cacheline responsive to the at least one unprotected cacheline satisfying the eviction threshold value.

20. The method of claim 19, wherein each of the plurality of cachelines includes a bit indicating whether the cacheline is protected or unprotected.

* * * * *